May 5, 1959 — A. W. DINGER ET AL — 2,885,254
MECHANICAL RECORDING INDICATOR
Filed May 19, 1955 — 2 Sheets-Sheet 1

May 5, 1959   A. W. DINGER ET AL   2,885,254
MECHANICAL RECORDING INDICATOR
Filed May 19, 1955                    2 Sheets-Sheet 2

United States Patent Office 2,885,254
Patented May 5, 1959

2,885,254

MECHANICAL RECORDING INDICATOR

Alfons Willy Dinger and Heinz Georg Emil Strelow, Minden, Westphalia, Germany, assignors to Schoppe & Faeser G.m.b.H., Minden, Germany, a limited-liability company of Germany Application May 19, 1955, Serial No. 509,621
In Germany April 9, 1949

Public Law 619, August 23, 1954
Patent expires April 9, 1969

10 Claims. (Cl. 346—17)

The invention relates to mechanical recording indicators for indicating and recording small strokes as used for measuring the thickness or differences in thickness. These indicators also may be employed if small vibrations have to be recorded.

It is the object of the present invention to provide an indicator which is easily transportable and permits indication as well as recording.

The indicator according to the invention is versatile, simple in construction, handy and of small weight. It comprises a feeler pin secured to a plunger. The plunger acts across a leaf spring upon a spring hinge supported pointer which also serves as a pen and records on a strip of paper moved by a small geared-down synchronous motor.

The invention now will be described in detail by reference to the accompanying drawings which show by way of example an embodiment of the invention.

Figure 1:
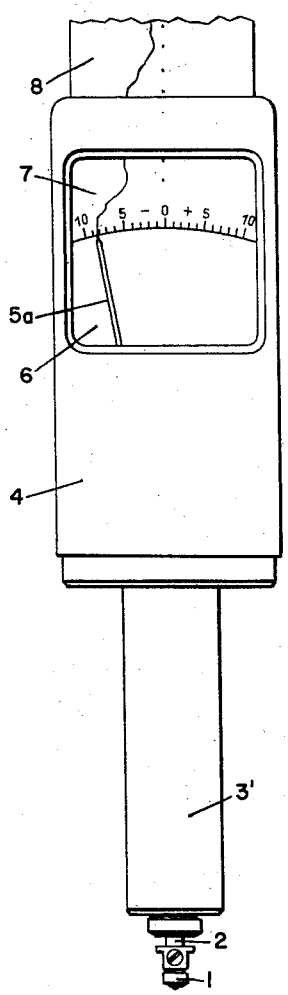
Fig. 1 shows the outer view of the indicator.

The indicator comprises a casing 4 capable of being swung open, a hollow stem portion and a stem sleeve 3'. Out of the free end of hollow stem and stem sleeve 3' there protrudes a plunger 2 carrying the feeler pin 1. The number 6 denotes a window in the casing. Through this window there is visible a pointer 5a moving along a scale 7. Below the scale a recording chart 8 is driven upwards. On this chart the record is made by the pointer which carries a pen 5c on its tip.

Figure 2:
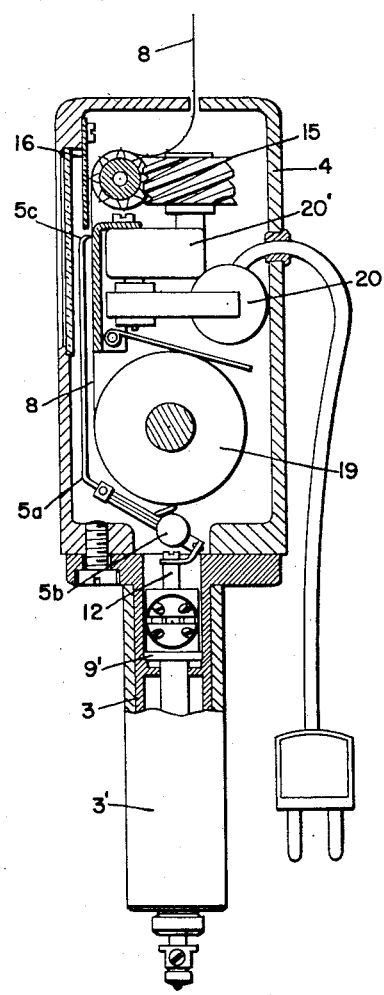
Fig. 2 is a view of the same indicator partly in section.
Figure 3:
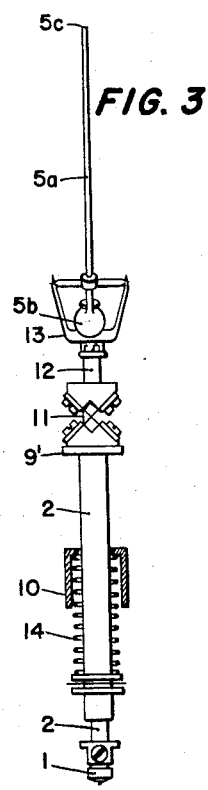
Fig. 3 shows the transmission mechanism.
Figure 4:
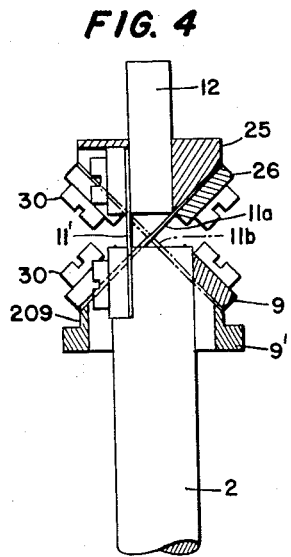
Fig. 4 is a sectional view of the spring hinge and leaf spring link the section being taken on the line 4—4 of Fig. 6 looking in the direction of the arrows of said line.

As shown in Figs. 2 and 3 the indicating and recording mechanism consists of pointer 5a with pen 5c on its tip and an ink container 5b on its other end. Pointer 5a consists of a capillary. Thus the ink from container 5b is led to the pen 5c and the pen is able to record. Pointer 5a is pivotally mounted in the forked head 13 of a connecting rod 12. The ink container 5b serves as a counter weight and balances out the weight of the capillary 5a and the pen 5c. Since the ink container is situated near the axis of rotation, the momentum of capillary 5a and pen 5c in respect to the axis of rotation is very small. Capillary 5a is bent as shown in Fig. 2. The center of gravity of parts 5a, 5b, 5c is chosen thus that pen 5c in the upright position of the indicator is forced down to the chart 8 by means of the momentum of the ink container 5c. In the off-center position of the indicator the momentum of capillary 5a and pen 5c exceeds the momentum of the ink container 5b and hence the pen 5c is slightly pressed against the chart in this position too. Connecting rod 12 is mounted to hollow stem portion by means of a spring hinge 11, a sleeve 9 and a flange 9', the parts 9 and 9' constitute an annular mounting member 209.

Spring hinge 11 permits connecting rod 12 to swing in a plane perpendicular to the plane within which pointer 5a is allowed to swing in forked head 13. Connecting rod 12 furthermore is connected to plunger 2 by means of one or more leaf springs 11'. The leaf springs which form the spring hinge are arranged with their planes lying perpendicular to one another and forming an angle of about 45° with the axis of the plunger. In order to produce an adjustable closed linkage between feeler pin 1 and the object to be measured plunger 2 is forced down against the object to be tested by a screw spring 14. Screw spring 14 bears against a bushing 10 rigidly but adjustably secured to hollow stem portion.

By employing spring hinge 11 as a bearing for the pointer and leaf spring 11' for connecting the plunger with the pointer, a frictionless and free from play transmission of the plunger movement to the pointer in enlarged scale is obtained. In order to reduce distortions of the scale it is recommendable to choose the point of action of the leaf spring 11' on the connecting rod 12 thus, that this point is situated on a straight line which passes through the center of rotation of the connecting rod 12 and forms an angle of about 45° with the axis of plunger 2. Furthermore the free length of leaf spring 11' is especially tuned.

Figure 6:
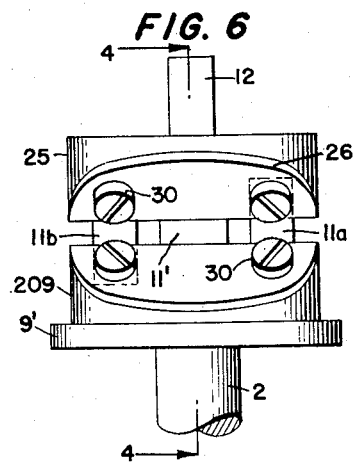
Figs. 6 and 7 are enlarged right and left views respectively of the hinge and link.
Figure 5:
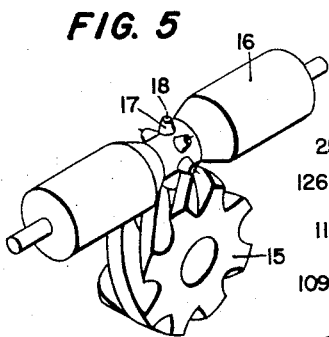
Fig. 5 shows the chart-driving roll and its pinion.
Figure 7:
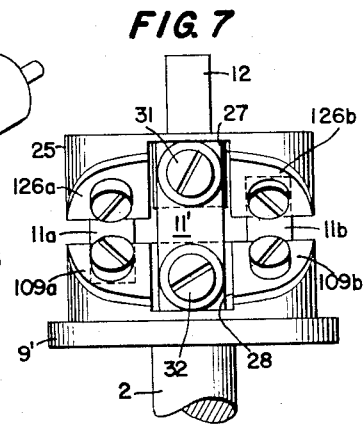

The enlarged showings in Figs. 6 and 7 aid in understanding the action of the hinge. The connecting rod 12 is held fast by a connecting part or socket member 25 which is attached to the annular member by means of a spring hinge generally designated 11. The hinge is made up of a plurality of leaf springs or spring blades such as 11a and 11b secured on the annular and socket members respectively and lying in mutually perpendicular planes with which the axis of the plunger makes an angle of about 45°. The line common to the two planes intersects, substantially, the axes of plunger and connecting rod.

The pointer 5a in traversing the chart 8 oscillates substantially about this common line in response to vertical movement of the plunger relative to the annular member 209. A leaf or transmitting spring 11', having the ends thereof secured to the connecting rod 12 and plunger 2 by means of screws 31 and 32, away from said common line converts reciprocatory motion of the plunger to oscillatory motion of the connecting rod and pointer 5a.

The springs 11a and 11b may be mounted or clamped on the respective annular and socket members by cover pieces 9 and 26 on the side away from the spring 11', the cover pieces being secured by screws 30.

On the side for the transmitting spring 11', recesses 27 and 28 are provided in the members 25 and 209 to provide space for the spring 11' and its mounting screws, and small cover pieces 126a, 126b, 109a and 109b may be used.

As pointed out one or more hinge springs may be used. By having four screws on a side additional hinge springs can thus be obviously provided.

The hollow stem portion envelops the transmission mechanism and is surrounded by stem sleeve 3'. Stem sleeve 3' is interchangeable. Thus the indicator can be used also in other devices of different stem diameter.

For driving the recording chart an electromotor 20 is provided. This motor drives a chart-driving roll 16 across a reduction gear 20' and a pinion 15. Chart-driving roll 16 is provided with transport pins 17, the tips 18 of which pierce into the chart 8 and pull the latter from the magazine roll 19. The holes in the chart caused by the transport pins simultaneously serve as a zero line for the evaluation of the record. Furthermore they represent time marks. The weak vibrations of the driving motor diminish the friction between pen 5c and chart 8.

For the driving mechanism there is no special motor needed. Any common synchronous motor with reduction gear will serve for this purpose. The transport pins 17 are involute shaped. A smaller or larger gear ratio may be had by interchanging pinion 15. The chart velocity hence can be varied within broad limits. Except changing pinion 15 no other alterations are necessary. No distances of axes must be altered.

The device according to the invention is specially suited for recording small strokes of the order 10–500 $\mu$.

We claim:

1. A mechanical indicator comprising a housing having a hollow stem portion projecting therefrom; a planar scale panel fast on the housing; a plunger mounted for reciprocatory motion in the stem portion and projecting thereout; a mounting member in the interior of the stem portion and secured thereto and surrounding an end portion of the plunger; a connecting member and connecting rod fast thereon in the stem portion, the rod normally being substantially coaxial with the plunger; a leaf spring mounted on the two members and lying in a plane with which the axis of the plunger makes an angle of about 45°, the plane being perpendicular to that of the panel, the leaf spring forming a hinge between the members to permit oscillation of the connecting rod axis within a plane parallel with that of the panel, and a spring strip normally in a plane perpendicular to that of the panel having ends mounted on sides of the connecting rod and plunger respectively for converting the reciprocatory motion of the plunger to oscillatory motion of the connecting rod.

2. An indicator as claimed in claim 1 and a pointer mounted on the connecting rod and associated with the scale panel.

3. An indicator as claimed in claim 2 and pivot means interposed in the pointer for permitting motion of an end of the pointer relative to axis of the rod but only in a plane normal to the panel.

4. A mechanical indicator comprising a housing having a hollow stem portion projecting therefrom; a planar scale panel fast on the housing; a plunger mounted for reciprocatory motion in the stem portion and projecting thereout; a mounting member in the interior of the stem portion and secured thereto and surrounding an end portion of the plunger; a socket member and connecting rod fast thereon in the stem portion, the rod normally being substantially coaxial with the plunger and having on the rod extension means for indicating the extent of oscillatory movement of the axis of the connecting rod; a plurality of leaf springs mounted on the two members and lying in planes perpendicular to that of the panel, the leaf springs forming a hinge between the members to permit oscillation of the connecting rod and extension means in a direction common with the plane of the panel, and a spring strip in a plane normal to the panel plane away from the pivotal zone of the hinge and having ends mounted on the connecting rod and plunger respectively for converting the reciprocatory motion of the plunger to oscillatory motion of the connecting rod.

5. A mechanical indicator comprising a housing having a hollow stem portion projecting therefrom; a planar scale panel fast on the housing; a plunger mounted for reciprocatory motion in the stem portion and projecting thereout; a mounting member in the interior of the stem portion and secured thereto and surrounding an end portion of the plunger; a socket member and connecting rod fast thereon in the stem portion, the rod normally being substantially coaxial with the plunger; a plurality of leaf springs mounted on the two members and lying in mutually perpendicular planes with which the axis of the plunger makes an angle of about 45° and which planes are perpendicular to that of the scale panel, the leaf spring forming a hinge between the members to permit oscillation of the connecting rod axis within a plane parallel with that of the panel; extension means on the rod associated with the scale panel, and a spring strip in a plane perpendicular to that of the panel and away from the axis of the plunger, the strip having ends mounted respectively on the connecting rod and plunger for converting the reciprocatory motion of the plunger to oscillatory motion of the connecting rod.

6. A mechanical indicator comprising a housing having a hollow stem portion projecting therefrom; a plunger mounted for reciprocatory motion in the stem portion and projecting thereout; a mounting member in the interior of the stem portion and secured thereto and surrounding an end portion of the plunger; a connecting member and connecting rod fast thereon in the stem portion, the rod normally being substantially coaxial with the plunger and having on the rod extension means for indicating the extent of oscillatory movement of the axis of the connecting rod; a plurality of leaf springs mounted on the two members and lying in mutually perpendicular planes with which the axis of the plunger makes an angle of about 45°, the leaf springs forming a hinge between the members to permit oscillation of the connecting rod and extension means; a spring strip away from the pivotal zone of the hinge and having ends mounted on the connecting rod and plunger respectively for converting the reciprocatory motion of the plunger to oscillatory motion of the connecting rod.

7. In a mechanical recorder, a housing, means for mounting a web of chart strip within the housing; a cylindrical roller for moving the chart strip from said web and having a mid portion of reduced diameter; radially extending gear teeth on said mid portion and approximately in the form of cones and having involute faces and sharp apices projecting beyond the extreme diameter of the roller for perforating the chart strip as the latter passes over the roller, and a drive spiral gear in engagement with said teeth.

8. A mechanical indicator comprising a housing having a hollow stem portion projecting therefrom; a plunger mounted for reciprocatory motion in the stem portion and projecting thereout; a mounting member in the interior of the stem portion and secured thereto and surrounding an end portion of the plunger; a socket member and connecting rod fast thereon in the stem portion, the rod normally being substantially coaxial with the plunger and having on the rod extension means for indicating the extent of oscillatory movement of the axis of the connecting rod; a plurality of leaf springs mounted on the two members and lying in mutually perpendicular planes with which the axis of the plunger makes an angle of about 45°, the leaf springs forming a hinge between the members to permit oscillation of the connecting rod and extension means; a spring strip away from the pivotal zone of the hinge and normally lying in a plane to which the axis of the plunger is parallel and having the ends thereof mounted on the connecting rod and plunger respectively for converting the reciprocatory motion of the plunger to said oscillatory motion of the connecting rod; means for mounting a web of chart strip within the housing; a cylindrical roller for moving the chart strip from said web and having a mid portion of reduced diameter; radially extending gear teeth approximately in the form of cones having involute faces on said mid portion and each having a sharp pin projecting beyond the extreme diameter of the roller for perforating the chart strip as the latter passes over the roller; a drive spiral gear in engagement with said teeth, and marking means on said extension means for making said chart strip.

9. A mechanical indicator comprising a hollow housing; a planar scale panel fast on the housing; a plunger mounted for reciprocatory motion in the housing and projecting thereout; a mounting member in the interior of the housing and secured thereto and surrounding an end portion of the plunger; a connecting member and connecting rod fast thereon in the stem portion, the rod normally being substantially coaxial with the plunger; a leaf spring mounted on the two members and lying in a plane with which the axis of the plunger makes an angle of about 45°, the plane being perpendicular to that of the panel, the leaf spring forming a hinge between the members to permit oscillation of the connecting rod axis within a plane parallel with that of the panel, and a spring strip normally in a plane perpendicular to that of the panel having ends mounted on sides of the connecting rod and plunger respectively for converting the reciprocatory motion of the plunger to oscillatory motion of the connecting rod.

10. A mechanical indicator comprising a hollow housing; a planar scale panel fast on the housing; a plunger mounted for reciprocatory motion in the housing and projecting thereout; a mounting member in the interior of the housing and secured thereto and surrounding an end portion of the plunger; a connecting member and connecting rod fast thereon in the stem portion, the rod normally being substantially coaxial with the plunger and having on the rod extension means for indicating the extent of oscillatory movement of the axis of the connecting rod; a plurality of leaf springs mounted on the two members and lying in planes perpendicular to that of the panel, the leaf springs forming a hinge between the members to permit oscillation of the connecting rod and extension means in a direction common with the plane of the panel, and a spring strip in a plane normal to the panel plane away from the pivotal zone of the hinge and having ends mounted on the connecting rod and plunger respectively for converting the reciprocatory motion of the plunger to oscillatory motion of the connecting rod.

References Cited in the file of this patent

UNITED STATES PATENTS

| | | |
|---|---|---|
| 912,003 | Lee | Feb. 9, 1909 |
| 1,050,872 | Torney | Jan. 21, 1913 |
| 1,599,268 | Angus | Sept. 7, 1926 |
| 1,708,972 | Lanphier et al. | Apr. 16, 1929 |
| 2,626,201 | Young et al. | Jan. 20, 1953 |
| 2,702,369 | Dreyfus | Feb. 15, 1955 |